(12) United States Patent
De Oto et al.

(10) Patent No.: US 7,567,223 B2
(45) Date of Patent: Jul. 28, 2009

(54) LIGHT-EMITTING DIODE (LED) HYSTERETIC CURRENT CONTROLLER

(75) Inventors: Leonard De Oto, Springfield, OH (US); Mitchell P. Henman, Sidney, OH (US)

(73) Assignee: Honeywell International Inc., Morristown, NJ (US)

( * ) Notice: Subject to any disclaimer, the term of this patent is extended or adjusted under 35 U.S.C. 154(b) by 744 days.

(21) Appl. No.: 11/069,298

(22) Filed: Mar. 1, 2005

(65) Prior Publication Data
US 2006/0197720 A1    Sep. 7, 2006

(51) Int. Cl.
*G09G 3/14* (2006.01)
(52) U.S. Cl. .............................. 345/46; 345/76; 345/82; 345/84
(58) Field of Classification Search ................. 315/291, 315/224, 247; 345/44–53, 76–85, 204–215
See application file for complete search history.

(56) References Cited

U.S. PATENT DOCUMENTS

| | | | |
|---|---|---|---|
| 4,071,884 A | 1/1978 | Maigret | |
| 4,504,776 A | 3/1985 | Haville | |
| 5,381,077 A | 1/1995 | McGuire | |
| 6,150,771 A | 11/2000 | Perry | |
| 6,153,985 A * | 11/2000 | Grossman | 315/291 |
| 6,285,139 B1 * | 9/2001 | Ghanem | 315/291 |
| 6,313,670 B1 | 11/2001 | Song et al. | |
| 6,362,579 B1 * | 3/2002 | Heizmann et al. | 315/370 |
| 6,400,101 B1 * | 6/2002 | Biebl et al. | 315/291 |
| 6,448,550 B1 | 9/2002 | Nishimura | |
| 6,489,724 B1 | 12/2002 | Smith et al. | |
| 6,611,110 B1 | 8/2003 | Fregoso | |
| 6,628,252 B2 | 9/2003 | Hoshino et al. | |
| 6,680,834 B2 | 1/2004 | Williams | |
| 6,798,152 B2 | 9/2004 | Rooke et al. | |
| 6,836,157 B2 | 12/2004 | Rader et al. | |

(Continued)

FOREIGN PATENT DOCUMENTS

EP    0 342 814 A2    11/1989

(Continued)

OTHER PUBLICATIONS

"Single Resistor Sets the Gain of the Best Instrumentation Amplifier"; Strong, Alexander & Hoskins, Kevin R.; Linear Technology Design Notes, No. 182; Jun. 1998, pp. 1-2.

(Continued)

*Primary Examiner*—Vijay Shankar
(74) *Attorney, Agent, or Firm*—Black Lowe & Graham PLLC (57) ABSTRACT

An LED current control device (100) includes a set of one or more LEDs (10) connected to a current-sensing element (20) and an external voltage source ($V_{EXT}$). A sense signal produced by the current-sensing element may be amplified by a sense signal amplifier (30) and sent to a switching controller (40 and 50). The switching controller may perform hysteretic control on the amplified sense signal by controlling a switching element 70 to turn on and off. The on and off states of the switching element respectively enables and disables power from the external voltage source to the LEDs. As such, hysteretic control may be performed on the current in the LEDs.

20 Claims, 7 Drawing Sheets

U.S. PATENT DOCUMENTS

| | | | |
|---|---|---|---|
| 6,841,947 | B2 | 1/2005 | Berg-johansen |
| 6,844,760 | B2 | 1/2005 | Koharagi et al. |
| 6,870,325 | B2 | 3/2005 | Bushell et al. |
| 7,071,762 | B2 * | 7/2006 | Xu et al. .................. 327/423 |
| 2002/0060526 | A1 | 5/2002 | Timmermans et al. |
| 2002/0158590 | A1 | 10/2002 | Saito et al. |
| 2003/0025465 | A1 | 2/2003 | Swanson et al. |
| 2003/0085749 | A1 * | 5/2003 | Xu et al. .................. 327/423 |
| 2003/0209997 | A1 | 11/2003 | St-Germain et al. |
| 2004/0239704 | A1 | 12/2004 | Soar |
| 2004/0257120 | A1 | 12/2004 | Wang et al. |
| 2005/0029527 | A1 | 2/2005 | Yamamoto et al. |
| 2005/0073489 | A1 | 4/2005 | Suzunaga et al. |
| 2006/0267514 | A1 * | 11/2006 | Xu .......................... 315/291 |

FOREIGN PATENT DOCUMENTS

| | | |
|---|---|---|
| JP | 05094151 | 4/1993 |
| JP | 2001-277583 A | 10/2001 |
| WO | WO 2004/057921 A1 | 7/2004 |
| WO | WO 2004/100614 A1 | 11/2004 |

OTHER PUBLICATIONS

"Ultra Low Power, Low Voltage, Rail-to-Rail Input Comparator with Open-Drain/Push-Pull Output", National Semiconductor, Feb. 2002, pp. 1-12.

"Application Note MLX10801 High Voltage Solutions," Melexis: Microelectronic Integrated Systems, 8 Pages, Sep. 29, 2004.

"IC Specification MLX 10801 Power LED driver for automotive applications, Power saving low side coil driver, Electronic Fuse," Melexis: Microelectronic Integrated Systems, 35 Pages, May 14, 2004.

* cited by examiner

LIGHT-EMITTING DIODE (LED) HYSTERETIC CURRENT CONTROLLER

FIELD OF THE INVENTION

The present invention is directed to regulating current in light-emitting diodes (LEDs) and, more particularly, to sensing and performing hysteretic control on the current in the LEDs.

BACKGROUND OF THE INVENTION

Currently, there exist systems for regulating the current in high powered light-emitting diodes (LEDs) that utilize a transistor to switch on and off the powering of the LEDs by an external voltage source. Such systems utilize a sensing resistor that can be used to monitor the current while the transistor is switched on. When the sensed current reaches a certain threshold, the powering of the LEDs from the external source is switched off for a predetermined period of time during which the current is not sensed. After this predetermined period, the transistor is turned back on. This process of on and off switching is repeated throughout the operation of the LEDs.

However, such systems for regulating LED current do not allow the sensing resistor to provide a very accurate measure of the average current. Also, in these systems, the time period between switching off and switching back on the LED power is determined based on a user-determined switching frequency—not the sensed current. As such, these systems cannot precisely control an average or root-mean-square (RMS) current flowing through the LEDs.

SUMMARY OF THE INVENTION

Exemplary embodiments of the present invention provide a device and method for performing hysteretic control of the current in a series of one or more light-emitting diodes (LEDs).

According to an exemplary embodiment, the device performs on and off switching of an externally supplied voltage source for the LED(s) in order to perform hysteretic control on the current flowing through the LED(s). A switching controller may be implemented in the current control device to control the on and off switching of a transistor (e.g., MOSFET switch) connected to the external voltage source.

In order to use hysteresis to control the current in the one or more LEDs, the LEDs may be connected in series to a current-sensing element that produces a signal indicative of the current in the LEDs during both the "on" and "off" switching states.

In an exemplary embodiment, the current-sensing element is designed to dissipate only a small amount of power to ensure efficient, but accurate, measurement of the current through the LEDs. Accordingly, the signal produced by the current-sensing element ("sense signal") may be amplified to a suitable level before being sent to the switching controller.

The current-sensing element may be a resistor ("sense resistor") whose ohmic value is designed so that the voltage across the resistor is small and little power is dissipated. The voltage across the sense resistor may be used as the sense signal that indicates the amount of current in the LEDs. Furthermore, an amplifier (e.g., instrumentation amplifier) may be connected to amplify this voltage ("sense voltage") across the sense resistor. Since the sense voltage is indicative of the current flowing through the LEDs, the amplified sense voltage may be sent from the amplifier to the switching controller.

Thus, hysteretic control may be performed on the amplified sense voltage in order to switch the external power of the LEDs on and off.

According to an exemplary embodiment, the switching controller may include a window comparator designed to compare the amplified sense voltage to a "window" comprised of upper and lower voltage thresholds ("trip levels"). Hysteretic control may be implemented by switching off the external power to the LEDs when the amplified sense signal reaches the upper trip level, and switching on the external power when the amplified sense signal decreases to the lower trip level.

The LEDs may also be connected in series to an energy storage element, which stores excess energy while switching is in the "on" state. Thus, while in the "on" state, the current in the LEDs will increase gradually, or "ramp up." During the "off" switching state, this excess energy may be dissipated in the LEDs, such that the current decreases gradually or "ramps down." In an exemplary embodiment, this storage element is an inductor.

According to an exemplary embodiment, the device and method of the present invention is used for controlling the current in three (3) LEDs connected in series. However, the number of LEDs may be reduced to two (2) or one (1) by adjusting component values, e.g., inductor and resistor values, in the device.

Further aspects in the scope of applicability of the present invention will become apparent from the detailed description provided hereinafter. However, it should be understood that the detailed description and the specific embodiments therein, while disclosing exemplary embodiments of the invention, are provided for purposes of illustration only.

BRIEF DESCRIPTION OF THE DRAWINGS

A more complete understanding of the present invention will become apparent from the following description taken in conjunction with the accompanying drawings, wherein.

DETAILED DESCRIPTION OF EXEMPLARY EMBODIMENTS

The present invention is directed to a device and method for controlling the current flowing through a series of one or more light-emitting diodes (LEDs).

Figure 1:
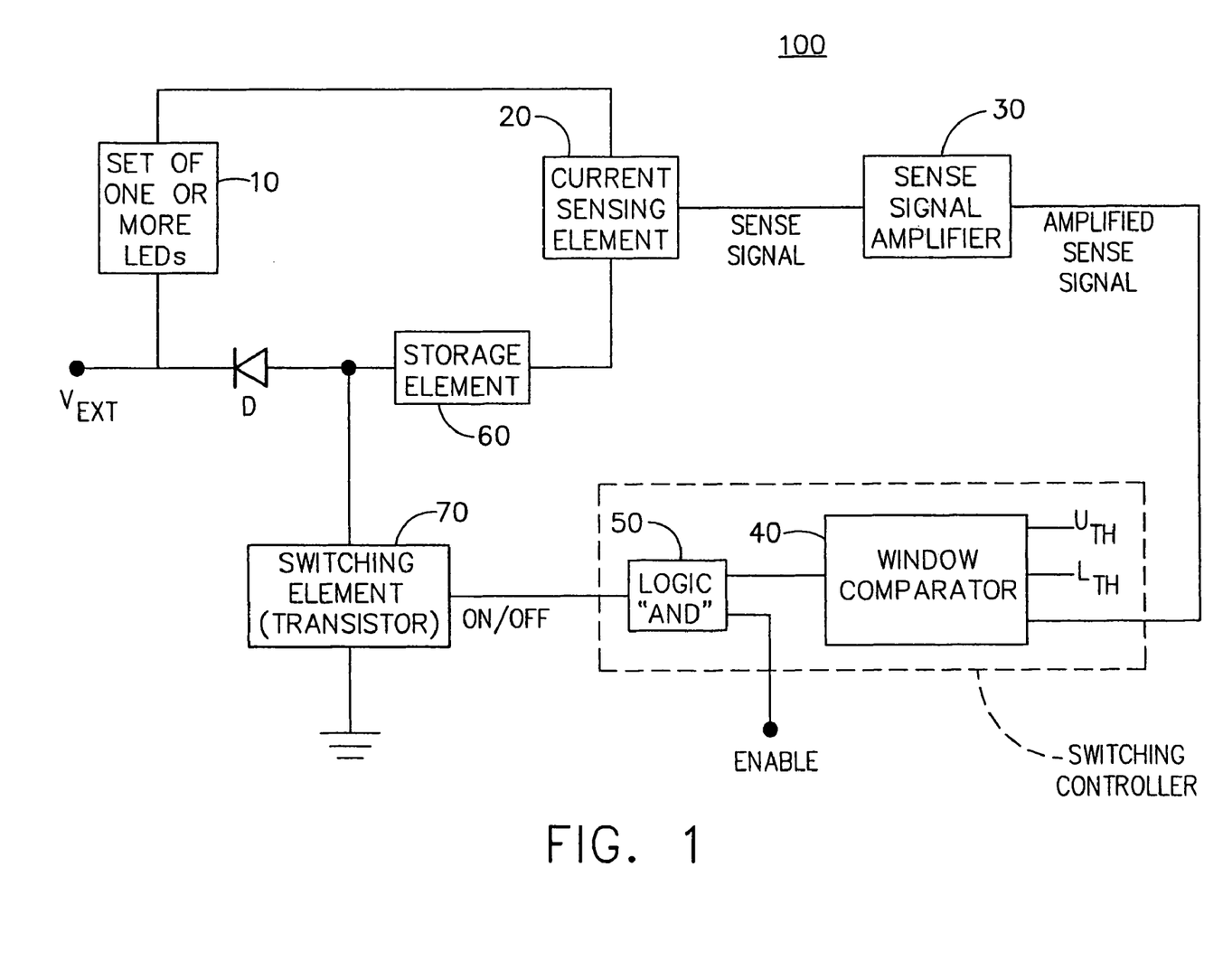
FIG. 1 illustrates a circuit diagram for a current control device, according to an exemplary embodiment of the present invention.
Figure 2:
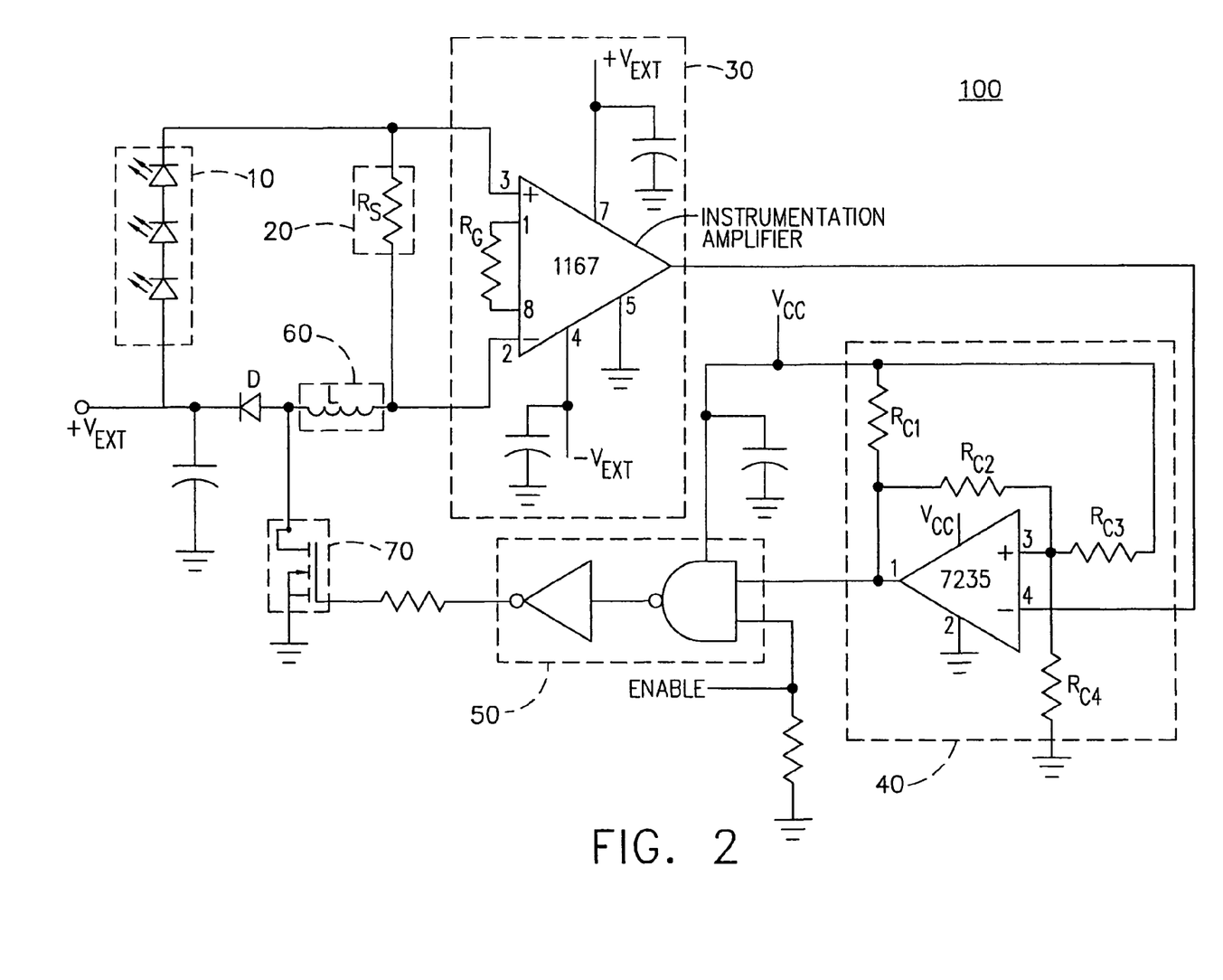
FIG. 2 illustrates a particular implementation of the current control device illustrated in FIG. 1, according to an exemplary embodiment of the present invention.

FIG. 1 is a block diagram representation of a device 100 for controlling LED current using hysteresis ("LED current control device 100"), according to an exemplary embodiment. Specifically, FIG. 1 shows an LED set 10 that comprises 1 or more LEDs connected in series. As shown in FIG. 2, the LED set 10 may be configured such that the anode of the first LED in the LED set 10 is connected to an external voltage source $V_{EXT}$. The cathode of the last LED connected in series in the LED set 10 is connected to the current-sensing element 20.

In an exemplary embodiment, the LED set 10 includes three (3) LEDs (as shown in FIG. 2). However, in alternative embodiments, the number of LEDs may be reduced to two (2) or one (1), or increased to four (4) or five (5). The LED set 10 may be comprised of white LEDs in an exemplary embodiment. However, LEDs of a different color may also be used in an alternative embodiment.

Referring to FIG. 1, a current-sensing element 20 is connected in series between the LED set 10 and an energy storage element 60 ("storage element"). The current-sensing element 20 is configured to produce a signal, which is indicative of the current flowing through each LED in the LED set 10. As shown in FIG. 1, this signal ("sense signal") is output to a sense signal amplifier 30. According to an exemplary embodiment, as shown in FIG. 2, the current-sensing element may be comprised of a resistor ("sense resistor").

As illustrated in FIG. 1, the storage element 60 is connected in series between the current-sensing element 20 and a diode D. In an exemplary embodiment, the storage element 60 may be comprised of an inductor (as shown in FIG. 2).

FIG. 1 further illustrates a diode D connected in series between the storage element 60 and the LED set 10. Specifically, the anode of the diode D is connected to the storage element 60, while the cathode is commonly connected to the anode of the first LED in the LED set 10 and the terminal to which the external voltage source $V_{EXT}$ is applied.

As mentioned above, the sense signal produced by the current-sensing element 20 is sent to a sense signal amplifier 30. The output of the sense signal amplifier 30 ("amplified sense signal") is sent to the window comparator 40. According to an exemplary embodiment, the sense signal amplifier 30 may be comprised of an instrumentation amplifier (as illustrated in FIG. 2).

FIG. 1 further illustrates a window comparator 40 and a logic AND device 50, which are collectively referred to as a "switching controller." The window comparator receives the amplified sense signal from the sense signal amplifier 30, and compares the received signal to an upper and lower voltage thresholds ("upper and lower trip levels") $U_{TH}$ and $L_{TH}$, respectively. In FIG. 1, an input of the logic AND device 50 is connected to the window comparator 40 in order to receive the result of the comparison operation performed on the amplified sense signal. Another input of the logic AND device 50 is connected to receive an externally applied ENABLE signal. Both the output of the window comparator 40 and the ENABLE signal may be digital signals having either a logical "High" or "Low" level. The logic AND device 50 is configured to perform a logical "AND" operation on the output signal of the window comparative 40 and the ENABLE signal. The output of the logic AND device 50 is connected to switching element 70 in such a manner as to control "on" and "off" switching of the switching element 70.

Referring to FIG. 1, the switching element 70 is connected to the output of the logic AND device 50, as described above. The switching element 70 also includes a connection to ground and is commonly connected to the anode of the diode D and the storage element 60. According to an exemplary embodiment, the switching element 70 is a transistor, whose "on" state is configured to reverse bias the diode D and provide an electrical path for current to flow from the storage element 60 to ground. In such an embodiment, the transistor's 70 "off" state allows the current from the storage element 60 to forward bias the diode D.

Principles of operation of exemplary embodiments of the LED current control device 100 will be described below, in connection with FIGS. 1 and 2. In particular, FIG. 2 is provided to illustrate a specific exemplary embodiment of the LED current control device 100 illustrated in FIG. 1. It should be noted that FIG. 2 is provided for purposes of illustration only and is not meant to limit the present invention to any particular exemplary embodiment illustrated therein or described herein below.

According to an exemplary embodiment, the external voltage source $V_{EXT}$ may be set to supply a voltage of substantially 15 volts (V). In such an embodiment, the LED set 10 may comprise up to three (3) LEDs connected in series. In situations where less than three (3) LEDs are implemented in the LED set 10, the frequency of the on and off switching and, thus, the frequency of the current flowing through the LED set 10 will increase in relation to the use of three (3) LEDs.

As such, it may be necessary to adapt certain component values in the LED current device 100 in situations where either one (1) or two (2) LEDs are implemented in the LED set 10, with respect to the component values that are used when three (3) LEDs are used. For instance, where the storage element 60 is comprised of an inductor, it may be necessary to increase the inductance value to accommodate the increased frequency that occurs when less than three (3) LEDs are used. It may also be necessary to adjust the trip levels of the window comparator 40, e.g., by adjusting one or more of the resistor values $R_{C1}$-$R_{C4}$ in the embodiment of FIG. 2.

According to another exemplary embodiment, more than three (3) LEDs may be included in the LED set 10. Specifically, either four (4) or five (5) LEDs may be utilized in the LED set 10. In such an embodiment, it may necessary to increase the external voltage source $V_{EXT}$ Up to substantially 20 V. It should be noted that, in situations where the sense signal amplifier 70 is comprised of an instrumentation amplifier, increasing the external voltage source $V_{EXT}$ to a level substantially above 20 V may produce undesired effects based on the range of supply voltage that is supported by the instrumentation amplifier.

According to an exemplary embodiment, white LEDs may be implemented in the LED set 10. However, the LED set 10 may include LEDs of other colors. For different embodiments that use different colored LEDs, it may necessary to adapt the component settings (e.g., inductor values) based on the different characteristics of different colored LEDs.

It will be readily apparent to those of ordinary skill in the art how to adapt component values in the LED current control device 100 based on the factors discussed above (e.g., based on the number and color of LEDs in the LED set 10).

The current-sensing element 20 senses the current flowing through the LED set 10. Specifically, the current-sensing element 20 produces a sense signal that indicates the amount of current flowing through the LED set 10 to current-sensing element 20.

According to an exemplary embodiment, the sense signal is the voltage across the current-sensing element 20. This sense voltage is substantially proportional to the current in the LED set 10. In the exemplary embodiment illustrated in FIG. 2, the current-sensing element 20 is a small resistor ("sense resistor"), and the voltage produced across the sense resistor 20 ("sense voltage") is the sense signal. In an exemplary embodiment, the sense resistor 20 is designed to have a small resistance, thereby resulting in low power consumption (and a small sense voltage). For example, the sense resistor 20 may have a resistance substantially within the range of 0.10-1 Ohms. As such, the sense voltage across the sense resistor 20 is able to accurately reflect the current in each of the LEDs of the LED set 10.

The sense signal produced by the current-sensing element 20 is amplified by the sense signal amplifier 30. For instance, in the exemplary embodiment illustrated in FIG. 2, the sense signal amplifier 30 may be implemented using an instrumentation amplifier circuit, which is connected to receive and amplify the sense voltage that is produced across the sense resistor 20. The use of the instrumentation amplifier is advantageous because it facilitates the use of up to three (3) LEDs that are connected in series in the LED set 10.

In an exemplary embodiment, an 1167-type instrumentation amplifier may be implemented for the sense signal amplifier 30. FIG. 2 illustrates the implementation of an 1167 instrumentation amplifier integrated circuit (IC), including the pin numbers of the 1167-type IC. Also, the external voltage source $V_{EXT}$ may be used to provide the positive voltage inputs (pin 7) to the 1167-type instrumentation amplifier.

According to exemplary embodiments utilizing an instrumentation amplifier (e.g., in FIG. 2), a resistor $R_G$ is used for setting the gain of the sense signal amplifier 30. This gain resistor $R_G$ may be connected between pins 1 and 8 of the 1167-type instrumentation amplifier. The gain of the instrumentation amplifier may be set according to the following equation:

$$\text{Gain} = 1 + (49.4k)/R_G \quad (EQ. 1)$$

According to an exemplary embodiment, the gain of the sense signal amplifier 30 may be set to substantially 20 by using a resistance value of $R_G$=2610 Ohms. However, in alternative exemplary embodiments, the gain of the sense signal amplifier 30 may be increased (e.g., up to substantially 100) by using smaller resistance values for the gain resistor $R_G$, or decreased (down to substantially 10) by using a larger $R_G$.

Although the exemplary embodiment in FIG. 2 illustrates the implementation of an 1167 type of instrumentation amplifier, such implementation is not limiting as to the present invention. Those of ordinary skill in the art will recognize that other types of instrumentation amplifiers may be used without departing from the spirit or scope of the present invention. Such other types of instrumentation amplifiers may be configured with an adjustable gain, similar to that described above.

According to an exemplary embodiment, the sense signal amplifier 30 is designed to amplify the sense voltage of the sense resistor 20 according to a scale of 1 V=100 milliAmperes (mAmp). To implement such a scale, where the gain of the sense signal amplifier 30 is set to 20 (i.e., $R_G$=2610 Ohms), the resistance of the sense resistor $R_S$ may be set to $R_S$=0.499 Ohms.

Referring to FIG. 2, capacitors may be implemented in the sense signal amplifier 30, according to an exemplary embodiment. These capacitors are used to provide a reservoir of energy to be used during the switching points of the hysteretic control performed by the switching controller (to be explained in more detail below). Suitable capacitance values for these capacitors will be readily determinable by those of ordinary skill in the art.

As illustrated in FIGS. 1 and 2, the amplified sense signal is sent to the switching controller. As illustrated in FIG. 1, the switching controller includes the window comparator 40 and the logic AND device 50. In exemplary embodiments, the switching controller performs hysteretic control on the amplified sense signal (and, thus, perform hysteretic control on the current in the LED set 10) in order to control the on and off switching of the switching element 70 (to be described in more detail below).

According to the exemplary embodiment illustrated in FIG. 2, the amplified sense signal (i.e., amplified sense voltage) is received by the window comparator 40. The window comparator 40 is designed to compare the received amplified sense voltage to the upper and lower voltage thresholds (upper and lower trip levels) $U_{TH}$ and $L_{TH}$. According to an exemplary embodiment, the window comparator 40 is configured as an inverting comparator with hysteresis. In other words, when the received amplified sense voltage is greater than the upper trip level $U_{th}$, the output of the window comparator 40 transitions to a Low logic level; when the amplified sense voltage is less than the lower trip level $L_{TH}$, the output of the window comparative 40 transitions into a High logic level.

According to an exemplary embodiment, as illustrated in FIG. 2, the window comparator 40 may be implemented using a 7235-type comparator IC (whose pin numbers are illustrated in FIG. 2) In such an embodiment, resistors may be used to set the upper and lower trip $U_{TH}$ and $L_{TH}$. In the particular embodiment illustrated in FIG. 2 resistors $R_{C1}$, $R_{C2}$, $R_{C3}$, and $R_{C4}$ are used to set the upper and lower trip levels $U_{TH}$ and $L_{TH}$.

For example, consider the case where hysteretic control is to be performed by the switching controller to maintain the current in the LED set 10 between 400 mAmp and 100 mAmp. Using the scale of 1 V=100 mAmp to produce the amplified sense voltage (as described above), the upper and lower trip levels $U_{TH}$ and $L_{TH}$ may be set at 4 V and 1 V, respectively.

According to the above example, the window comparator 40 may be configured as follows. The supply voltage $V_{CC}$ of the 7235 comparator (e.g., in FIG. 2) may be set to 5 V. To set the upper and lower trip levels $U_{TH}$ and $L_{TH}$, the following resistance values may be used: $R_{C1}$=2.0k Ohms, $R_{C2}$=1.0k Ohms, $R_{C3}$=3.48k Ohms, and $R_{C4}$=6.49k Ohms. Other circuit configurations would be similar to those illustrated in FIG. 2.

In order to implement another current-to-voltage scale for the amplified sense voltage, or an alternative hysteresis range for the current in the LED set 10, it will be apparent to those of ordinary skill in the art how to determine the appropriate values of $R_{C1}$, $R_{C2}$, $R_{C3}$, and $R_{C4}$. For instance, the upper and lower trip levels $U_{TH}$ and $L_{TH}$ may be set in such a manner as to set a particular root-mean-square (RMS) current or average current to flow through the LED set 10.

Figure 5A:
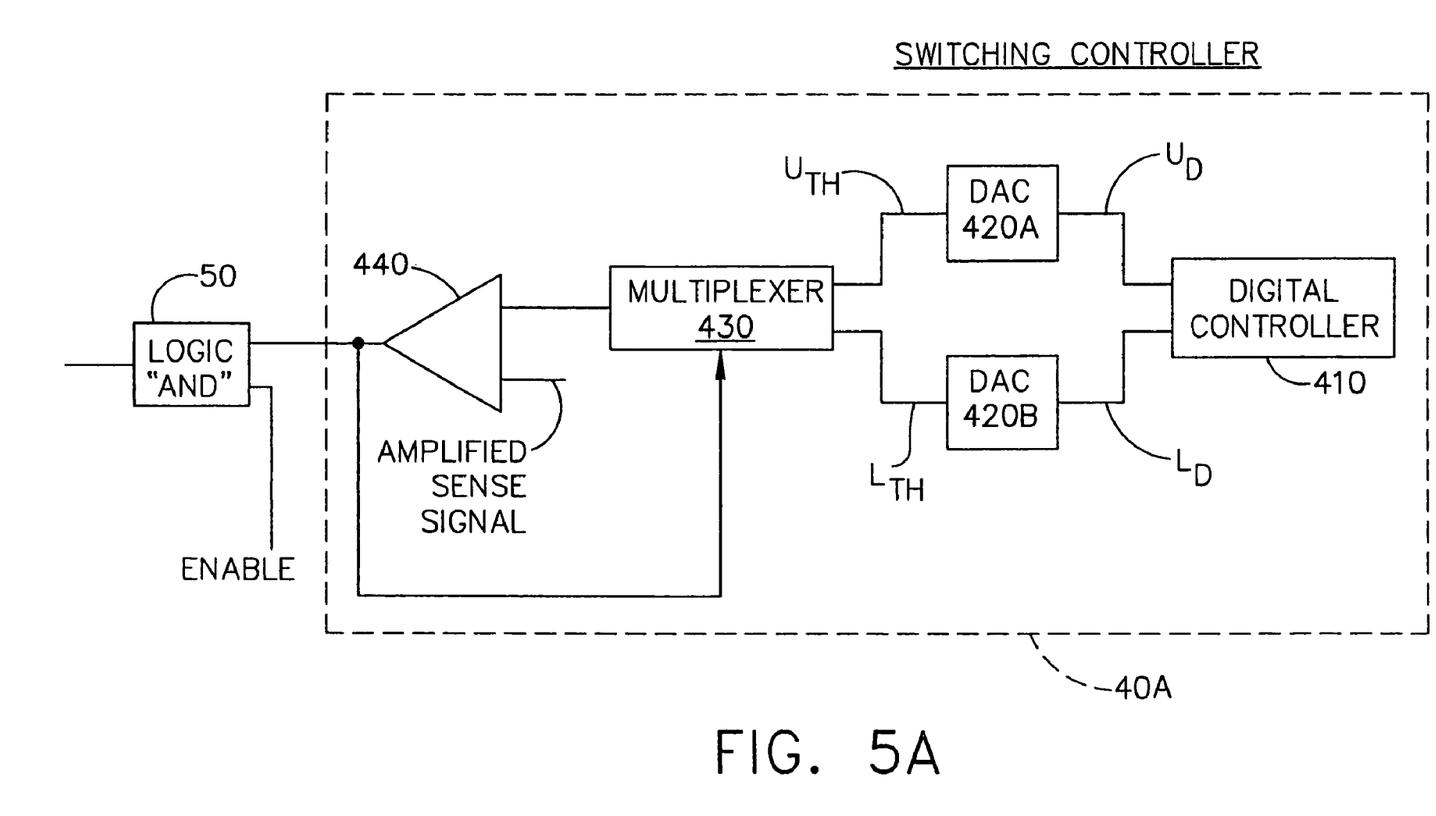
FIGS. 5A and 5B are circuit diagrams illustrating alternative exemplary embodiments of the present invention.
Figure 5B:
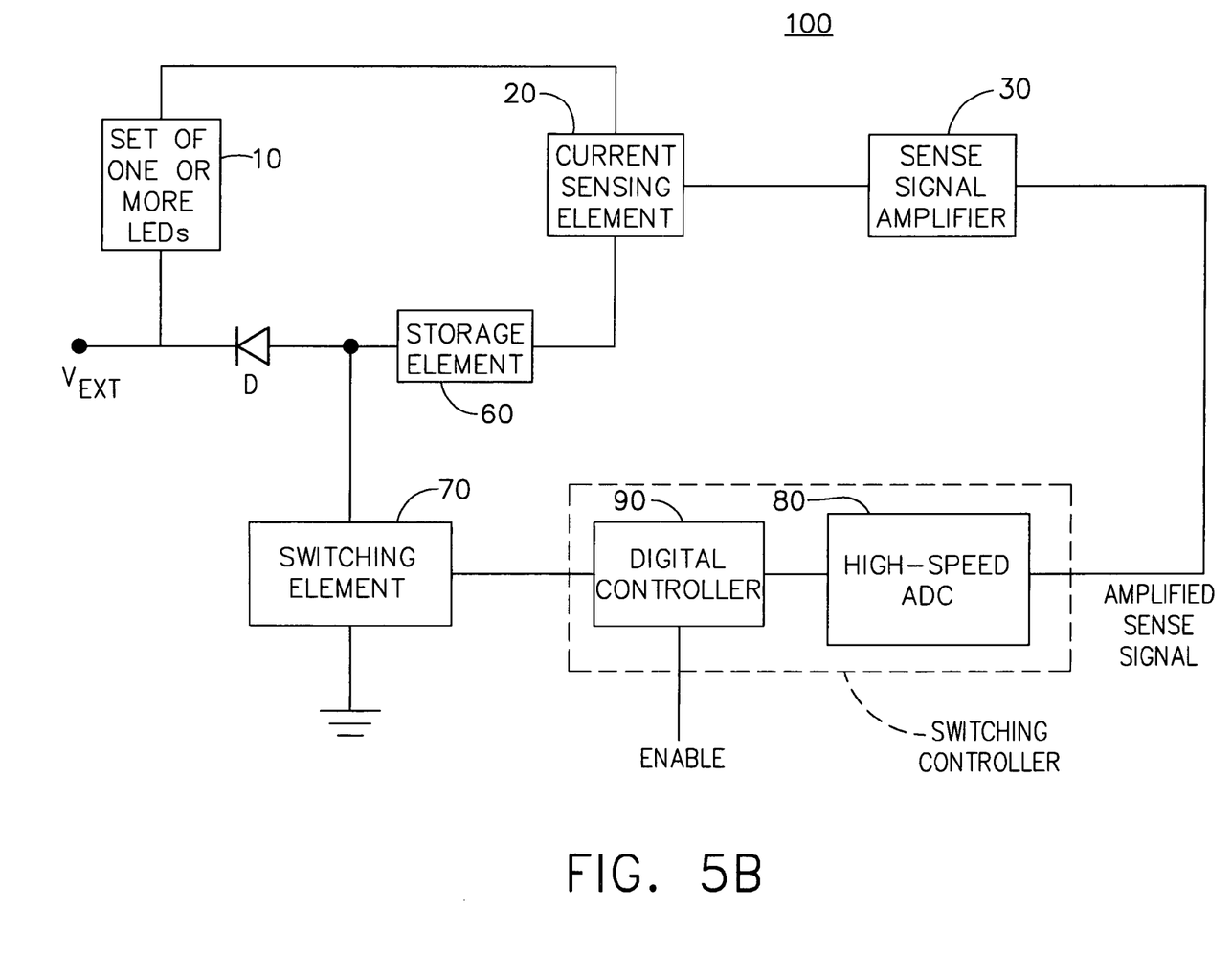

Although the embodiment in FIG. 2 illustrates the implementation of a 7235 type of comparator, such implementation is not limiting as to the present invention. Those of ordinary skill in the art will recognize that other types of comparator circuits or ICs may be used in the window comparator 40 without departing from the spirit and scope of the present invention. Also, those of ordinary skill in the art will recognize that the window comparator 40 utilize different general circuit configurations (e.g., as illustrated in FIG. 5B below).

Referring to the switching controller in FIGS. 1 and 2, the logic AND device 50 is implemented to provide external control of the LED set 10 through the use of an externally applied ENABLE signal. For instance, when the ENABLE signal is in the Low logic state, the switching element 70 will be turned off regardless of the signal output from the window comparator 40.

According to the exemplary embodiment illustrated in FIG. 2, the logic AND device 50 may be implemented using a logical AND gate whose output is connected to a logical NOT gate. However, this configuration is merely provided for illustration, and other configurations (e.g., using a single AND device) may be used.

The use of the logic AND device 50 may allow the ENABLE signal to be used to perform pulse width modulation (PWM) dimming. For instance, PWM dimming may be performed externally by, e.g., switching the ENABLE between High and Low logic levels in such a manner as will be readily apparent to those of ordinary skill in the art. Also, the external ENABLE signal can be used simply as an "On/Off" switch for the LED set 10.

The output of the logical AND device 50 is used for turning on and off the switching element 70. According to an exemplary embodiment, a MOSFET switch may be used as the switching element, as illustrated in FIG. 2. In such an embodiment, the gate of the MOSFET switch 70 may be connected to receive the output of the switching controller. The drain of the MOSFET switch 70 may be connected to both the anode of diode D and the inductor 60, while the source of the MOSFET switch 70 is connected to ground.

The following will describe the operation of the LED current control device 100 as the switching element 70 is switched from the off to on state, according to an exemplary embodiment.

The switching element 70 will be switched to the on state when two conditions are satisfied: (1) the amplified sense signal is below the lower trip level $L_{TH}$ in the window comparator 40, and (2) the ENABLE is set to High level. As such, the switching element 70 will reverse bias the diode D, thereby shutting the diode D off. The external voltage source $V_{EXT}$ powers up each of the LEDs in the LED set 10. Accordingly, current flows through the electrical path from $V_{EXT}$ to the LED set 10, the current-sensing element 20 (e.g., sense resistor 20), the storage element 60, and the switching element 70 to ground.

As current flows in such a manner, the storage element 60 stores excess energy, thus causing the flowing current to increase linearly or "ramp up." Accordingly, the current in the LED set 10 ramps up while the switching element 70 is turned on. According to an exemplary embodiment, the storage element 60 is an inductor L, as illustrated in FIG. 2.

Next, the operation of the LED current control device 100 will be described as the switching element 70 is switched from on to off, according to an exemplary embodiment.

The switching element 70 will switch off when either the amplified sense signal rises above the upper trip lever $U_{TH}$ in the window comparator 40, or the ENABLE signal transitions to the Low level.

Consider the situation where the switching element 70 is switched from on to off in response to the amplified sense signal rising above the upper trip level $U_{TH}$. The diode D becomes forward biased, thus disabling the external voltage source $V_{EXT}$ from powering the LED set 10. However, current does not stop flowing through the LED set 10. Instead, the excess energy stored in the storage element 60 (while the switching element 70 was turned on) is dissipated through the diode D, the LED set 10, and the current-sensing element 20. The current flowing through the diode D, LED set 10, and the current-sensing element 20 decreases linearly or "ramps down" until the amplified sense signal reaches the lower trip level $L_{TH}$. The switching element 70 is turned back on after the amplified sense signal reaches trip level $L_{TH}$ (unless the ENABLE signal is at Low level).

Particularly, in the exemplary embodiment of FIG. 2, the switching off of MOSFET switch 70 causes the inductor L to switch polarity and force current through the forward biased diode D. This causes the current flowing through the LED set 10 and sense resistor ($R_S$) 20 to ramp down until the amplified sense voltage output from the instrumentation amplified reaches the lower trip level $L_{TH}$ and the MOSFET switch 70 is turned on (assuming that ENABLE is High).

The switching controller continues switching its output between High and Low logic levels, thereby causing the LED current control device 100 to switch between modes of operation in which the current in the LED set 10 ramps up (on state) and ramps down (off state). Thus, hysteretic control is performed by the switching controller on the current flowing through the one or more LEDs in the LED set 10.

According to the specific exemplary embodiment illustrated in FIG. 2, the inductor L may be implemented with an inductance value that ensures that the switching frequency does not become so high that the instrumentation amplifier loses control of the on and off switch points. To ensure that the frequency is maintained at an appropriate level, the inductance of inductor L may be adapted based on variations in the number of LEDs in the LED set 10 or the voltage level of the external voltage source $V_{EXT}$. It would be readily apparent to those of ordinary skill in the art how to set the inductance value of the inductor L based on such factors.

As shown in FIG. 2, the LED current device 100 may include various other components (e.g., capacitors and resistors) to ensure stable operation of the LED current control device 100. However, FIG. 2 is provided for proposes of illustration only and is not meant to be limiting on the present invention. Specific implementations, as well as variations, on the elements and circuit configurations illustrated in FIGS. 1 and 2 are within the scope of the present invention, as will be readily contemplated by those of ordinary skill in the art.

For example, it would be readily apparent to those of ordinary skill in the art that the LED current control device 100 may be modified to allow for dynamic adjustment of the trip levels $U_{TH}$ and $L_{TH}$ in the window comparator 40. Such modifications may include the implementation of one or more rheostats in the resistor network ($R_{C1}$, $R_{C2}$, $R_{C3}$, and $R_{C4}$) of the window comparator 40 illustrated in FIG. 2.

According to other exemplary embodiments, the LED current control device 100 may be modified to provide dynamic adjustment of the trip levels $U_{TH}$ and $L_{TH}$. FIGS. 5A and 5B illustrate alternative embodiments to provide such dynamic adjustment.

FIG. 5A illustrates an alternative exemplary embodiment of a window comparator 40A in the LED current control device 100. Specifically, the window comparator 40A includes a digital controller 410 that outputs digital values $U_D$ and $L_D$ corresponding to the upper and lower trip levels. For example, digital controller 410 may include a microprocessor-based device that allows a user to input and adjust the average/RMS value of the current to flow through the LED set 10. Based on the input value, the digital controller 410 may be configured to calculate the necessary values for $U_D$ and $L_D$.

Referring to FIG. 5A, the digital controller 410 outputs the digital values $U_D$ and $L_D$ to digital-to-analog converters (DACs) 420A and 420B, respectively. DACs 420A and 420B convert the respective values $U_D$ and $L_D$ into the upper and lower trip levels $U_{TH}$ and $L_{TH}$, respectively. The upper and lower trip levels are sent to the multiplexer 430. Based on the current state of hysteretic control (i.e., whether the amplified sense signal is ramping up or down), the multiplexer 430 may be programmed to select the relevant trip voltage $U_{TH}$ or $L_{TH}$ to be applied to comparator 440. Specifically, the output of the comparator 440 may be used as a control signal to select whether $U_{TH}$ or $L_{TH}$ should be output.

In FIG. 5A, comparator 440 may be implemented using any type of comparator IC or device, as will be contemplated by those of ordinary skill in the art. The comparator 440 compares the amplified sense signal from the sense signal amplifier 30 to the trip level ($U_{TH}$ or $L_{TH}$) output from the multiplexer 430.

The comparator 440 may be configured as an inverting comparator with hysteresis. As the amplified sense signal is ramping down, the amplified sense signal is compared to the lower trip level $L_{TH}$. The output of the comparator 440 will be Low level until the amplified sense signal reaches the lower threshold, at which point the comparator 440 will output a High level. The High output of the comparator causes the multiplexer 430 to output the upper trip level $U_{TH}$ to the comparator 440. Accordingly, the increasing amplified sense signal is compared to $U_{TH}$, and the comparator's 440 output remains High until $U_{TH}$ is reached. When the amplified sense signal reaches $U_{TH}$, the comparator 440 outputs a Low signal. This causes the multiplexer to output the lower trip level $L_{TH}$ to the comparator 440 for comparison with the decreasing amplified sense signal, etc.

Referring to FIG. 5A, the output of the comparator 440 is sent to the logic AND device 50, and the rest of the circuit operates as described above in relation to FIG. 1.

FIG. 5B illustrates another exemplary embodiment in which the trip levels $U_{TH}$ and $L_{TH}$ are dynamically adjusted. Specifically, FIG. 5B illustrates an alternative embodiment in which the configuration of the switching controller in the LED current control device 100 differs from that illustrated in FIG. 1.

Specifically, the switching controller of FIG. 5B includes a high-speed analog-to-digital converter (ADC) 80 for receiving the amplified sense signal. The output of the high-speed ADC 80 is connected to a digital controller 90. The digital controller's 90 output is connected to the switching element 70. The digital controller 90 may comprise, e.g., a microprocessor-based device for receiving a user's input regarding the desired average/RMS current.

In FIGS. 1 and 5B, similar elements are given like reference numerals and operate according to the same principles described above in connection with FIG. 1.

In the embodiment of FIG. 5B, the digital controller 90 performs the function of both the window comparator 40 and logic AND device 50 of FIG. 1. The digital controller 90 may be capable of adjusting the upper and lower trip levels $U_{TH}$ and $L_{TH}$ based on a user's input (e.g., average or RMS current level for the LED set 10). In an exemplary embodiment, the digital controller 90 contains internal registers for storing $U_{TH}$ and $L_{TH}$, respectively.

In FIG. 5B, the digital controller 90 may be configured to continuously compare the output of the high-speed ADC 80 to the trip levels $U_{TH}$ and $L_{TH}$ in order to perform hysteretic control of the amplified sense signal. The digital controller 90 may further be configured to output a signal that turns the switching element 70 on or off depending on the comparison result (and the state of the ENABLE signal).

Figure 3A:
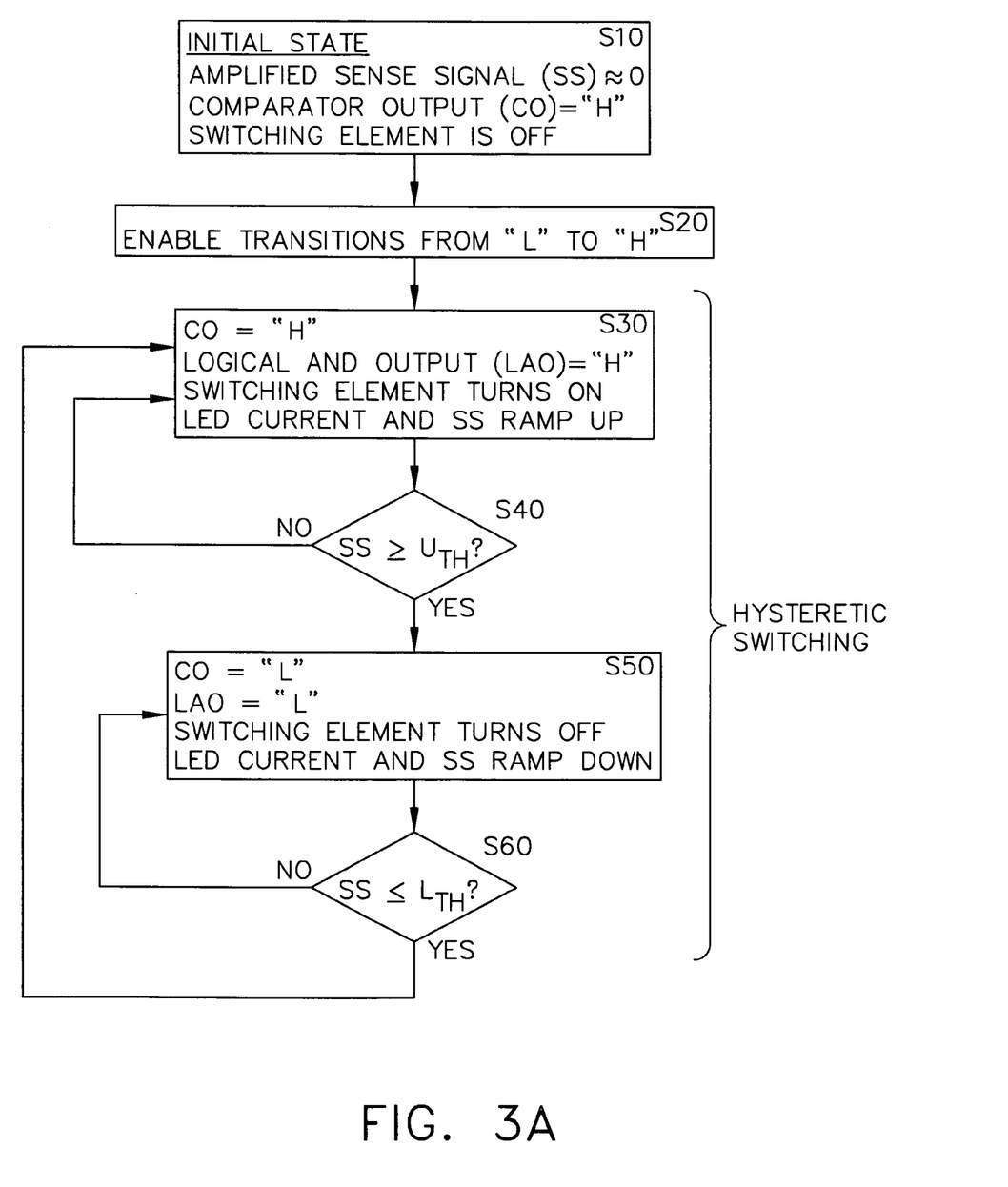
FIGS. 3A and 3B are flowcharts illustrating the process of the current control device, according to an exemplary embodiment of the present invention.
Figure 3B:
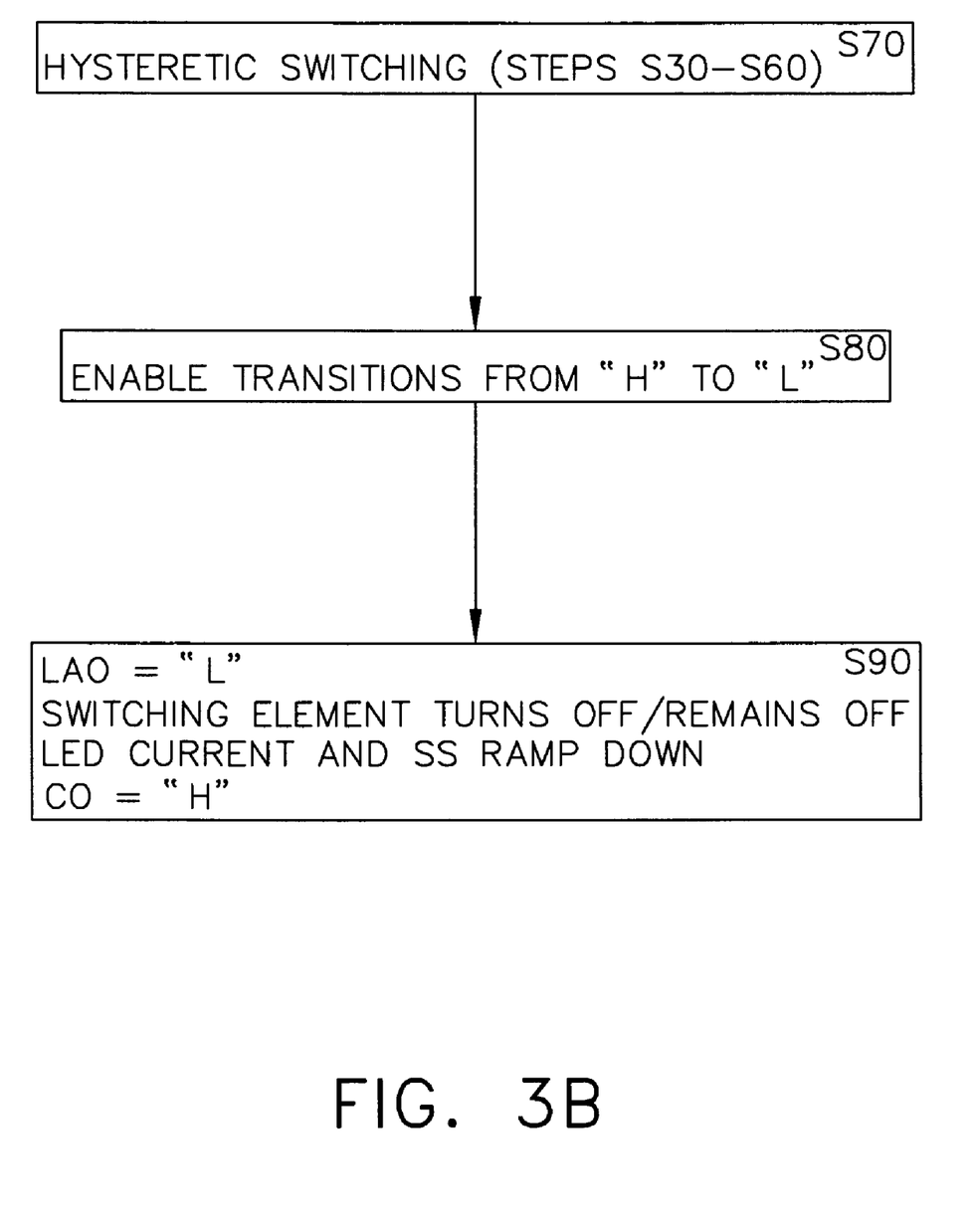
Figure 4:
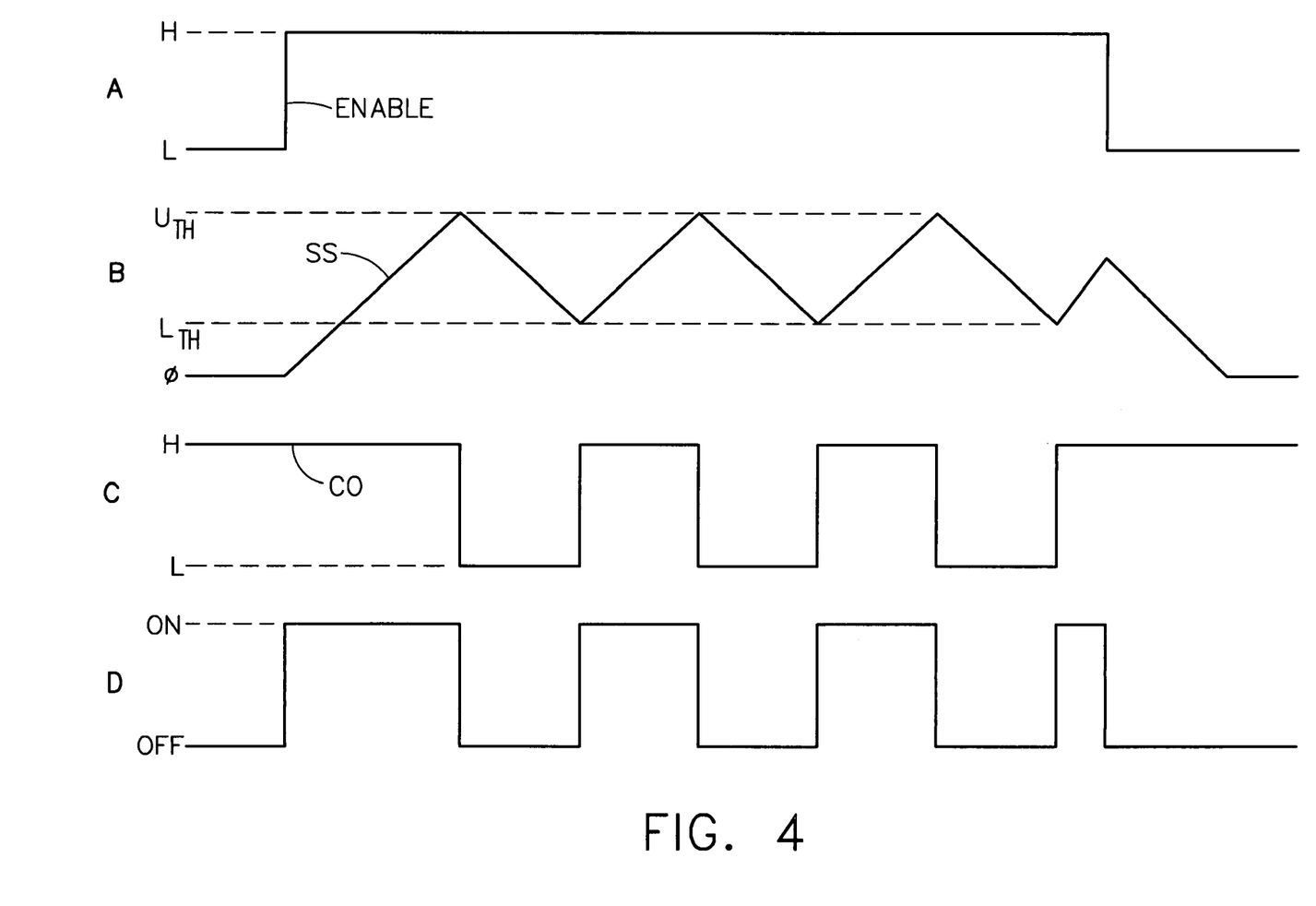
FIG. 4 is a set of timing diagrams illustrating the process of the current control device, according to an exemplary embodiment of the present invention.

Next, the operation of the LED current control device 100 according to exemplary embodiments will be described in connection with FIGS. 3A, 3B, and 4. FIG. 3A is a flowchart describing the operation of controlling LED current when the ENABLE signal transitions from Low to High logic level, according to the exemplary embodiment. FIG. 3B is a flowchart describing the operation when the ENABLE signal transitions from High to Low logic level, according to an exemplary embodiment. FIG. 4 illustrates a timing diagram illustrating the operation of various elements and signals in relation to the ENABLE signal.

Referring to FIG. 4, diagram A illustrates the ENABLE signal as a function of time. Diagram B of FIG. 4 illustrates the amplified sense signal ("SS"), which is substantially proportionally to the current flowing through the LED set 10, as a function of time. In FIG. 4, diagram C illustrates the logic level of the output of the window comparator 40 ("CO"), as a function of time. Diagram D of FIG. 4 illustrates the state (on or off) of the switching element 70, as a function of time.

Referring to FIG. 3A, the initial values of the amplified sense signal SS and the output CO of the window comparator 40, as well as the initial state of the switching element 70, as indicated in block S10. Particularly, the amplified sense signal is substantially equal to zero, due to the fact that the ENABLE signal is initially at a Low level, and the external voltage source $V_{EXT}$ is disabled from powering the LED set 10. As also illustrated in S10, the output CO of the window comparator 40 is initially at a HIGH level because the amplified sense signal is below the lower trip level $L_{TH}$. Even though the output CO of the window comparator 40 is High, the switching element 70 is in the off state because the ENABLE signal is at the Low level. This initial state is illustrated at the left-most portion of diagrams A-D in FIG. 4.

In FIG. 3A, block S20 illustrates the step in which the ENABLE signal transitions from Low to High level. As shown in block S30, the output of the logic AND device 50 ("LAO") becomes a High-level signal due to the transition of the ENABLE signal. As such, the switching element 70 turns on, as shown in S30. This causes the current in the LED set 10 and the amplified sense signal SS to ramp up, as shown in S30. FIG. 4 illustrates the change in the state of the switching element 70 and the ramping up of the amplified sense signal SS in response to the transition of the ENABLE signal from Low to High.

As illustrated in FIG. 3A, block S30 represents one of the two operation modes between which the LED current control device 100 switches while hysteretic switching is being performed by the switching controller. The LED current control device 100 will remain in this mode until the amplified sense signal reaches the upper trip level $U_{TH}$, at which time the LED current control device 100 switches to the other mode of operation. This switching is illustrated by decisional block S40 and block S50 of FIG. 3A. When the upper trip level $U_{TH}$ is reached by the amplified sense signal SS, the output CO of the window comparator 40 becomes Low, thereby causing the logical AND device 50 to output a Low signal, as shown in S50. Thus, the switching element 70 turns off, and the current in the LED set 10 and the amplified sense signal SS ramp down, as shown in S50.

Referring to FIG. 3A, the LED current control device 100 remains in the operational mode represented by block S50 until the amplified sense signal SS decreases to the lower trip level $L_{TH}$, as illustrated by decisional block S60. Once the lower trip level is reached, the hysteretic control of the switching controller causes the switching element 70 to turn on, according to S30, thereby causing the current in the LED set 10 to again ramp up.

As illustrated in FIG. 4, the LED current control device 100 alternates between the operational modes in which the current in the LED set 10 and the amplified sense signal SS ramps up (switching element 70 is on), and the current in the LED set 10 and the amplified sense signal ramps down (switching element 70 is off). This alternating between modes (i.e., hysteretic control) continues until the ENABLE signal transitions from High to Low level, as shown in FIG. 4. As shown in diagram B in FIG. 4, the amplified sense signal SS (and, thus, the current level in the LED set 10) approximates a sawtooth ramping function.

FIG. 3B is a flowchart illustrating the operation of the LED current control device 100 in response to the ENABLE signal changing from High to Low level. Specifically, block S70 shows that the hysteretic switching continues (according to S30-S60 in FIG. 3A) while the ENABLE signal is at the High level. In block S80, the ENABLE signal transitions from High to Low level.

As a result of the ENABLE signal transition, the following will occur, as illustrated by block S90 in FIG. 3B. The output LAO of the logical AND device 50 will either change to Low level (if currently at the High level), or remain at the Low level (if currently at the Low level). Thus, the switching element 70 will either turn off (if currently in the on state) or remain off (if currently in the off state). Accordingly, the current in the LED set 10 and the amplified sense signal SS with either start or continue to ramp down.

In FIG. 3B, block S90 also shows what happens to the output CO of the window comparator 40. If the window comparator's 40 output CO is currently Low when the ENABLE signal changes to Low, the output CO will transition to High as the amplified sense signal SS reaches the lower trip level $L_{TH}$. If the output CO of the window comparator 40 is already at the High level when ENABLE becomes Low, the output CO will remain at High.

The right-most portion of diagrams A-D in FIG. 4 illustrate the situation described above in connection with block S90 of FIG. 3B.

Exemplary embodiments of the present invention provide several advantages over existing systems. For example, an exemplary embodiment allows for the current flowing through each LED to be sensed while the external power to the LEDs is both turned on and off. This allows the current to be regulated using hysteresis. As such, the current in each LED may be accurately set to a particular RMS or average level. Also, accurate PWM control may be implemented using an external signal (ENABLE).

It should also be noted that exemplary embodiments of the present invention (e.g., as illustrated in FIG. 2) are fault tolerant, in the sense that a short occurring in one of the LEDs in the LED set 10 does not prevent other LEDs from continuing to operate.

Exemplary embodiments being thus described, it should be noted that any variations thereof may be made without the parting from the spirit and scope of the present invention.

What is claimed is:

1. An apparatus for controlling a current in one or more light-emitting diodes (LEDs), comprising:
    a series-connection of elements, including:
        the one or more LEDs, each LED with an input connection and an output connection, and
        a current-sensing element with an input connection and an output connection, wherein the current-sensing element input connection is coupled to the output connection of one of the LEDs, and wherein the current-sensing element produces a signal indicative of the current in the one or more LEDs;
    a sense signal amplifier with an input connection and an output connection, wherein the sense signal amplifier input connection is coupled to the current-sensing element, and wherein the sense signal amplifier outputs an amplified sense signal;
    a window comparator switching controller with an input connection and an output connection, wherein the switching controller input connection is coupled to the sense signal amplifier output connection to receive the amplified sense signal, and wherein the window comparator switching controller outputs a control signal that controls on and off switching of an externally supplied voltage source of the series-connection of elements based on the signal in order to perform hysteretic control on the current in the one or more LEDs;
    a switching element with an input connection, an output connection and a control connection, wherein the switching element input connection is coupled to the LED output connection, wherein the switching element output connection is coupled to a ground, wherein the switching element control connection is communicatively coupled to the window comparator switching controller output connection, and wherein on and off states of the switching element respectively turn on and off the externally supplied voltage for the series-connection of elements, the switching element being switched on or off based upon the control signal output by the window comparator switching controller; and
    a storage element configured to store excess energy when the window comparator switching controller controls on switching of the externally supplied voltage source, and configured to dissipate the stored energy to the one or more LEDs when the window comparator switching controller controls off switching of the externally supplied voltage source, such that the current in the one or more LEDs approximates a ramping function that linearly increases when the externally supplied voltage source is switched on and linearly decreases when the externally supplied voltage source is switched off.

2. The apparatus of claim 1, wherein the series-connection of elements includes three LEDs connected in series.

3. The apparatus of claim 2, wherein a short in one of the one or more LEDs does not prevent operation of the remaining ones of the one or more LEDs according to the hysteretic control.

4. The apparatus of claim 1, wherein the switching element is a MOSFET switch.

5. The apparatus of claim 1, wherein the series-connection of elements includes the storage element.

6. The apparatus of claim 1, wherein the storage element is an inductor.

7. The apparatus of claim 1, wherein
    the current-sensing element signal is amplified and sent to the window comparator switching controller, and
    the window comparator switching controller performs hysteretic control on the amplified signal.

8. The apparatus of claim 1, wherein the current-sensing element is a resistor, and the signal is a voltage across the resistor.

9. The apparatus of claim 8, wherein the sense signal amplifier comprises:
    an amplifier configured to receive and amplify the voltage across the resistor, the amplifier providing an amplified voltage to the window comparator switching controller.

10. The apparatus of claim 9, wherein the amplifier is an instrumentation amplifier having an adjustable gain.

11. The apparatus of claim 8, wherein
    the window comparator switching controller includes a window comparator with two trip levels, and
    the on and off switching is controlled based on the relationship of the signal to the trip levels.

12. The apparatus of claim 8, wherein the window comparator switching controller constantly monitors the voltage across the resistor to control the on and off switching.

13. The apparatus of claim 12, wherein the window comparator switching controller includes a switching element whose on and off states respectively turn on and off the externally supplied voltage for the series-connection of elements, the window comparator switching controller switching the switching element on and off to perform hysteretic control on the voltage across the resistor.

14. The apparatus of claim 13, wherein the switching element is a MOSFET switch.

15. The apparatus of claim 1, wherein
the current-sensing element is a resistor and the produced signal is a voltage across the resistor, and
the window comparator switching controller performs hysteretic control based on the voltage across the resistor.

16. The apparatus of claim 1, further comprising:
a logic AND device coupled to the window comparator switching controller output connection and coupled to an enable signal, the logic AND device having an output connection coupled to the switching element control connection, wherein the switching element is on response to the enable signal.

17. A method for controlling a current in one or more light-emitting diodes (LEDs), comprising:
sensing the current through a sensing element regardless of whether an externally supplied voltage source is switched on or off, wherein the one or more LEDs and the sensing element are connected as a series-connection of elements, and wherein the sensing element is connected to an output of the last one of the one or more LEDs;
amplifying the sensed current with a sense signal amplifier;
outputting an amplified sense signal from the sense signal amplifier;
receiving the amplified sense signal at an input of a window comparator switching controller;
outputting a control signal to a switching element, the switching element having an output coupled to a ground;
controlling on and off switching of the externally supplied voltage source of the series-connection of elements based upon the output control signal received by the switching element;
storing excess energy when the externally supplied voltage source is switched on; and
dissipating the stored energy to the one or more LEDs when the externally supplied voltage source is switched off, such that the current in the one or more LEDs approximates a ramping function that linearly increases and decreases,
wherein the controlling on and off switching provides hysteretic control on the sensed current in the one or more LEDs.

18. The method of claim 17 wherein the series connection of elements includes a resistor in series with the one or more LEDs, and comprising:
sensing the voltage across the resistor; and
amplifying the voltage with the sense signal amplifier.

19. The method of claim 17, wherein the series connection of elements includes an inductor in series with the one or more LEDs, and comprising:
storing excess energy in the inductor when the externally supplied voltage source is switched on; and
dissipating the stored energy to the one or more LEDs when the externally supplied voltage source is switched off, such that the current in the one or more LEDs approximates a ramping function that linearly increases and decreases.

20. The method of claim 19, wherein the controlling on and off switching includes:
comparing a signal indicative of the current in the one or more LEDs with a two trip voltages; and
switching, based on the comparing, a transistor on and off,
wherein the transistor's on and off states respectively switch the externally supplied voltage on and off for the series-connection of elements.

* * * * *